UNITED STATES PATENT OFFICE.

FRED. J. SLADE, OF TRENTON, NEW JERSEY.

IMPROVEMENT IN THE MANUFACTURE OF STEEL.

Specification forming part of Letters Patent No. 103,094, dated May 17, 1870.

I, FRED. J. SLADE, of Trenton, in the county of Mercer and State of New Jersey, have invented an Improvement in the Method of Making Steel in the Reverberatory Furnace, of which the following is a specification:

In the process of making steel for which Letters Patent were granted to Emille and Pierre E. Martin, of Paris, France, a bath of cast-iron is first melted and brought to a white heat on the bed of a reverberatory furnace, and to this are added successive charges of wrought-iron or steel scrap or ore until the whole charge becomes totally decarbonized, or very nearly so. This decarbonized metal is then made into malleable steel by the addition of a recarbonizer, such as Franklinite iron, spiegeleisen, or sometimes ordinary pig-iron.

My improvement consists in dispensing with the use of the bath of cast-iron, and instead thereof I commence the operation by melting a certain amount of steel, or even wrought-iron scrap, and to this liquid bath I add, as in Martin's process, successive charges of steel or wrought-iron, scrap or ore, previously heated, until the whole is decarbonized and purified, and I then recarbonize the metal to bring it to the condition of workable steel of whatever grade may be required.

The advantage gained by my improvement is a great saving of time in effecting the decarbonization of the charge, and an improvement of the quality of the product, since the steel or wrought-iron used to form the bath contains much less carbon than the cast-iron used in Martin's process, and is also generally free from the impurities often found in pig-iron.

It is proper to state that the decarbonization of the charge may be effected by simply allowing it to remain in a state of fusion on the hearth of the furnace at a high temperature without any addition being made to it; but this method requires a longer time for the completion of the operation without presenting adequate advantages to compensate for this objection.

Claim.

I claim as my invention—

The manufacture of steel of superior quality by the decarbonization and subsequent recarbonization of a bath of molten steel or wrought-iron on the hearth of the reverberatory furnace, substantially in the manner above described.

FRED. J. SLADE.

Witnesses:
 JAMES S. AITKIN,
 F. S. McNEELY.